US012691317B2

(12) United States Patent
Rogers et al.

(10) Patent No.: US 12,691,317 B2
(45) Date of Patent: Jul. 28, 2026

(54) SPRINKLER FRAME SUPPORT BRIDGE

(71) Applicant: Tyco Fire Products LP, Cranston, RI (US)

(72) Inventors: Kenneth Wayne Rogers, West Warwick, RI (US); Johan M. Duran, Coventry, RI (US); Timothy Palaski, Johnston, RI (US)

(73) Assignee: Tyco Fire Products LP, Cranston, RI (US)

(*) Notice: Subject to any disclaimer, the term of this patent is extended or adjusted under 35 U.S.C. 154(b) by 225 days.

(21) Appl. No.: 18/291,724

(22) PCT Filed: Oct. 29, 2021

(86) PCT No.: PCT/US2021/057310
§ 371 (c)(1),
(2) Date: Jan. 24, 2024

(87) PCT Pub. No.: WO2023/075789
PCT Pub. Date: May 4, 2023

(65) Prior Publication Data
US 2025/0090882 A1 Mar. 20, 2025

(51) Int. Cl.
*A62C 37/11* (2006.01)

(52) U.S. Cl.
CPC .................................... *A62C 37/11* (2013.01)

(58) Field of Classification Search
CPC .......... A62C 37/11; A62C 37/12; A62C 37/14
See application file for complete search history.

(56) References Cited

U.S. PATENT DOCUMENTS

| | | | | | |
|---|---|---|---|---|---|
| 777,783 | A * | 12/1904 | Garrett | A62C 37/12 | 169/39 |
| 4,108,247 | A * | 8/1978 | Mohler | A62C 37/14 | 169/38 |
| 4,880,063 | A * | 11/1989 | Leininger | A62C 37/12 | 169/37 |
| 5,494,113 | A * | 2/1996 | Polan | A62C 37/16 | 169/37 |
| 6,112,821 | A * | 9/2000 | Yokoi | A62C 37/12 | 169/41 |

(Continued)

FOREIGN PATENT DOCUMENTS

| | | | |
|---|---|---|---|
| CN | 110251873 | A | 9/2019 |
| JP | 2019-092790 | A | 6/2019 |

OTHER PUBLICATIONS

Korean Intellectual Property Office as International Searching Authority; International Search Report and Written Opinion; International Patent Application No. PCT/US2021/057310; Jul. 22, 2022; 12 pages.

*Primary Examiner* — Joseph A Greenlund
(74) *Attorney, Agent, or Firm* — Foley & Lardner LLP

(57) ABSTRACT

A sprinkler includes a body, a button, an activation element, and a support bridge. The body defines an outlet. The button seals the outlet. The activation element is coupled with the button. The support bridge is coupled with the activation element, and includes a center, a first arm extending from the center, a second arm extending from the center, opposite the first arm, and an arch extending from the first arm to the second arm, the arch having a flat shape.

16 Claims, 18 Drawing Sheets

(56) References Cited

U.S. PATENT DOCUMENTS

| | | | | |
|---|---|---|---|---|
| 6,152,236 | A * | 11/2000 | Retzloff | A62C 37/14 169/56 |
| 6,308,784 | B1 * | 10/2001 | Mears | B05B 1/265 169/37 |
| 6,367,559 | B1 * | 4/2002 | Winebrenner | A62C 37/11 239/524 |
| 6,446,732 | B1 * | 9/2002 | Polan | B05B 1/265 169/57 |
| 6,715,561 | B2 * | 4/2004 | Franson | A62C 37/14 169/17 |
| 6,962,208 | B2 * | 11/2005 | Franson | A62C 37/09 169/41 |
| 10,046,190 | B2 * | 8/2018 | Polan | A62C 37/12 |
| 10,420,968 | B2 * | 9/2019 | Polan | A62C 31/28 |
| 10,799,740 | B2 * | 10/2020 | Pipe | A62C 37/14 |
| 11,253,737 | B2 * | 2/2022 | Shields | B05B 1/30 |
| 11,344,758 | B2 * | 5/2022 | Oldham | A62C 37/12 |
| 12,233,297 | B2 * | 2/2025 | English | A62C 37/14 |
| 2001/0042795 | A1 * | 11/2001 | Franson | A62C 37/09 169/37 |
| 2005/0006717 | A1 | 1/2005 | Yamaguchi et al. | |
| 2006/0086510 | A1 * | 4/2006 | Pahila | A62C 37/14 169/42 |
| 2011/0030977 | A1 * | 2/2011 | Polan | A62C 31/02 169/37 |
| 2012/0267125 | A1 * | 10/2012 | Abels | A62C 37/08 169/41 |
| 2015/0297927 | A1 * | 10/2015 | Pipe | A62C 37/14 169/37 |
| 2016/0030785 | A1 * | 2/2016 | Ringer | A62C 35/68 169/41 |
| 2017/0296852 | A1 * | 10/2017 | Pipe | A62C 37/09 |
| 2023/0038975 | A1 * | 2/2023 | Chiba | A62C 37/09 |
| 2024/0001183 | A1 * | 1/2024 | Rogers | A62C 31/28 |
| 2024/0198154 | A1 * | 6/2024 | Chiba | A62C 37/11 |
| 2025/0090882 | A1 * | 3/2025 | Rogers | B05B 1/262 |

* cited by examiner

SPRINKLER FRAME SUPPORT BRIDGE

BACKGROUND

Buildings and other areas can include sprinklers that provide fire protection. In the event of a fire, the sprinklers can dispense a fluid so as to suppress or extinguish the fire or to protect building elements from exposure to heat radiating from the fire.

SUMMARY

At least one aspect relates to a sprinkler. The sprinkler can include a body, a button, an activation element, and a support bridge. The body defines an outlet. The button seals the outlet. The activation element is coupled with the button. The support bridge is coupled with the activation element, and includes a center, a first arm extending from the center, a second arm extending from the center, opposite the first arm, and an arch extending from the first arm to the second arm, the arch having a flat shape.

At least one aspect relates to a sprinkler. The sprinkler assembly can include a body, a frame, a button, an activation element, and a bridge. The body includes an opening arranged around an axis. The frame is coupled with the body. The button includes a slanted surface to be received in the opening. The activation element facilitates the button sealing the opening. The bridge is releasably coupled with the button and the activation element, and includes a first planar surface and a second planar surface opposite the first planar surface.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
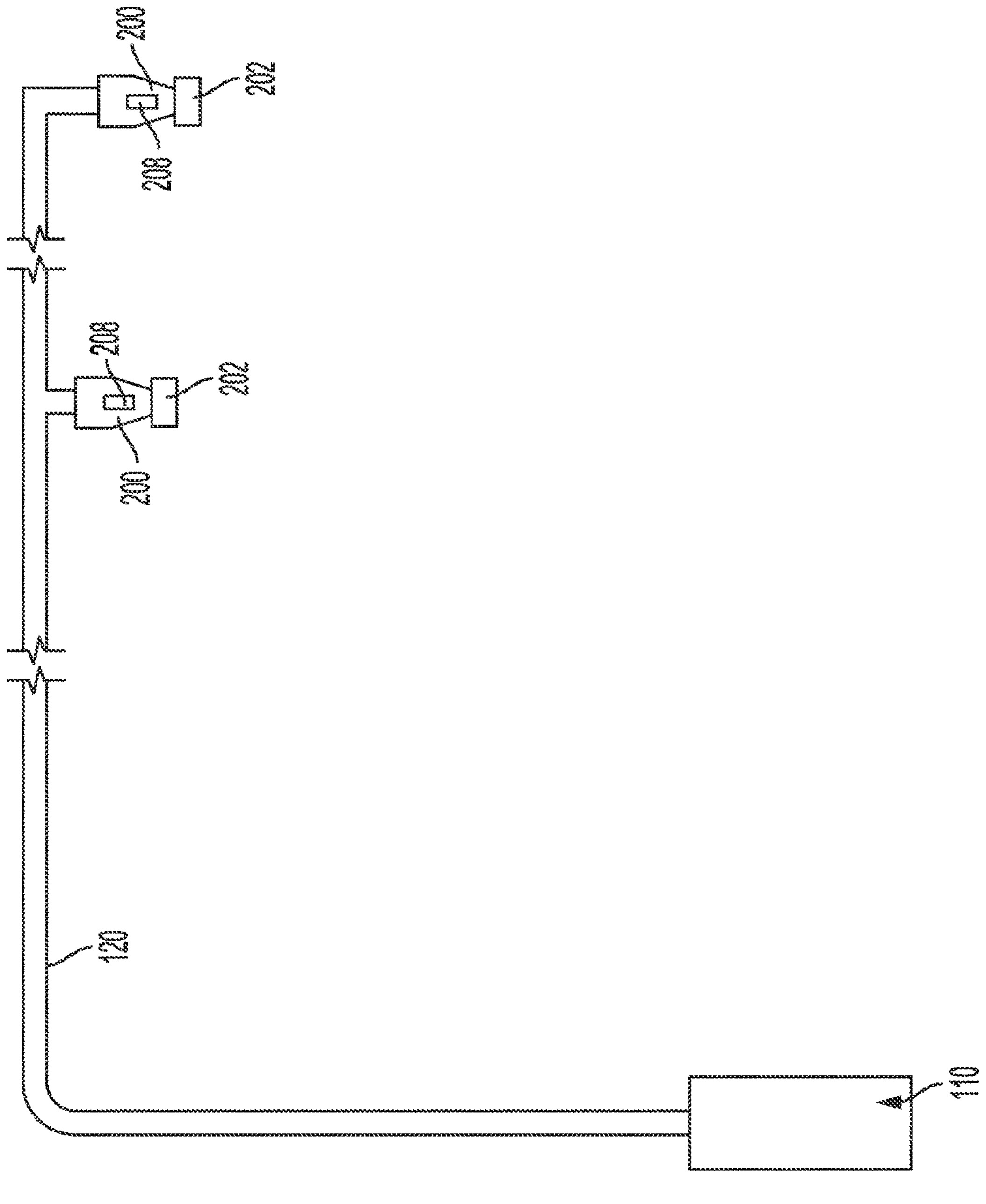
FIG. 1 is a block diagram of a fire suppression system.

Before turning to the figures, which illustrate certain examples, it is noted that the present disclosure is not limited to the details or methodology set forth in the description or illustrated in the figures. The terminology used herein is for the purpose of description only and should not be regarded as limiting.

The present disclosure generally relates to a fire sprinkler. More particularly, the present disclosure relates to a fire sprinkler that includes a support bridge that can provide a trigger mechanism, or lever, for the fire sprinkler, and/or provide support to an activation element (e.g., thermal element, such as a glass bulb). Fire protection systems include sprinklers that can inhibit or permit flow of fluid (typically water, but also in some applications fire suppressant fluid) depending upon conditions. In the instance of a fire or detected conditions that may be indicative of a fire (e.g., increased heat, smoke, etc.), the sprinklers can permit the flow of fluid such that the fluid can contact a deflector and be dispersed so as to provide exposure protection to a window or wall. The sprinklers can disperse water or fire protection fluid over a specific area, for example a portion of a room or hallway, or a window or wall. In order to accomplish fire exposure protection for a given area (e.g., room, hallway, window, wall, etc.), sprinklers can include components that permit flow of fire protection fluid in response to activation of one or more fire sprinklers. For example, a fire sprinkler can include one or more components that provide a fluid seal, thus preventing passage of fire protection fluid when the fire sprinkler is in an inactivated state. Due to a shape of the support bridge, a force can be applied along a center sprinkler axis used for sealing the waterway orifice. However, these components can permit passage of fire protection fluid upon activation of the fire sprinkler, thus providing fire protection fluid to the given area. For instance, due to its shape, the support bridge can provide a lever or cam type mechanical reaction of motion for clearing the path of the fire protection fluid stream.

Fire protection fluid can be supplied to a fire sprinkler via a fluid supply or a network of piping. A support bridge can be provided within the fire sprinkler so as provide structural rigidity and to act as a support member for a sealing assembly (e.g., one or more of a sprinkler button that seals an outlet of the sprinkler and an activation element that holds the sprinkler button in the outlet until a fire condition causes activation of the activation element) to retain the fire protection fluid within the fluid supply or piping until the fire sprinkler is activated. The fire protection fluid can be stored in the fluid supply or piping in a pressurized state such that the fire protection will exit the fire sprinkler upon activation at a flow velocity and volumetric flow rate sufficient to provide fire protection or suppression for a desired area. The support bridge ultimately clears the stream (e.g., waterway) of the fire sprinkler from interference due to sealing components moving freely upon activation, allowing the waterway to flow freely and unobstructed to the deflector.

The fire sprinkler can be used in at least two orientations. For instance, the sprinkler can be used in an upright configuration (e.g., a discharge orifice positioned pointing in an upward position) or a pendent configuration (e.g., a discharge orifice positioned pointing in a downward position). Further, the sprinkler can be configured in an attic or a concealed application. The support bridge can slightly interfere with the spray characteristics of the sprinkler on one side while in the upright configuration, while providing secondary effect to the spray characteristics of the water distribution of the sprinkler. When spraying in an upright configuration, the support bridges adds the spray characteristic a "short throw" water distribution towards the support bridge side of the sprinkler while providing a "long throw" distribution away from the integral support bridge side of the sprinkler. The specialized spray characteristic caused by the integral support bridge provides added value in an attic fire suppression system, for instance, due to the "long throw" characteristic of the open side of the sprinkler. When a fire sprinkler is used in the upright configuration, the water flows from both ends, so in an attic on top of ridge, the sprinkler can have a "throw" on both sides and provide full protection.

FIG. 1 depicts an example of a fire suppression system 100. The fire suppression system 100 can be a chemical fire suppression system. The fire suppression system 100 can distribute a fire suppressant agent onto or nearby a fire, extinguishing the fire and preventing the fire from spreading. The fire suppression system 100 can be used alone or in combination with other types of fire suppression systems (e.g., a building sprinkler system, a handheld fire extinguisher). Multiple fire suppression systems 100 can be used in combination with one another to cover a larger area (e.g., each in different rooms of a building).

The fire suppression system 100 can be used in a variety of applications. The fire suppression system 100 can be used with a variety of fire suppressant agents, including but not limited to water (e.g., may use powders, liquids, foams, or other fluid or flowable materials).

The fire suppression system 100 can include or be coupled with a fluid supply 110. The fluid supply 110 can define an internal volume filled (e.g., partially filled, completely filled) with fire suppressant agent. The fluid supply 110 can provide fluid from a remote location to a building in which the fire suppression system 100 is located.

Piping 120 (e.g., one or more pipes, tubes, conduits) can be fluidly coupled with one or more sprinklers 200. The sprinklers 200 can receive water or other fire suppressant agent from the fluid supply 110 via the piping 120. The sprinklers 200 each define one or more outlets, through which the fire suppressant agent exits and contacts a deflector 202, such as to form a spray of water or other fire suppressant agent that covers a desired area. The sprays from the sprinklers 200 then suppress or extinguish fire within that area. The deflectors 202 of the sprinklers 200 can be shaped to control the spray pattern of the fire suppressant agent leaving the sprinklers 200. The sprinklers 200 can be used as concealed sprinklers.

The sprinklers 200 can include an activation element (e.g., thermal element) 208. The activation element 208 can change from a first state that prevents fluid flow out of the sprinkler 200 to a second state that permits fluid flow of the sprinkler 200 responsive to a fire condition. For example, the activation element 208 can include a glass bulb including a fluid that expands responsive to an increase in temperature (e.g., responsive to heat provided to the fluid from a fire), such as to cause the glass bulb to break responsive to the temperature meeting or exceeding a threshold temperature.

Figure 2:
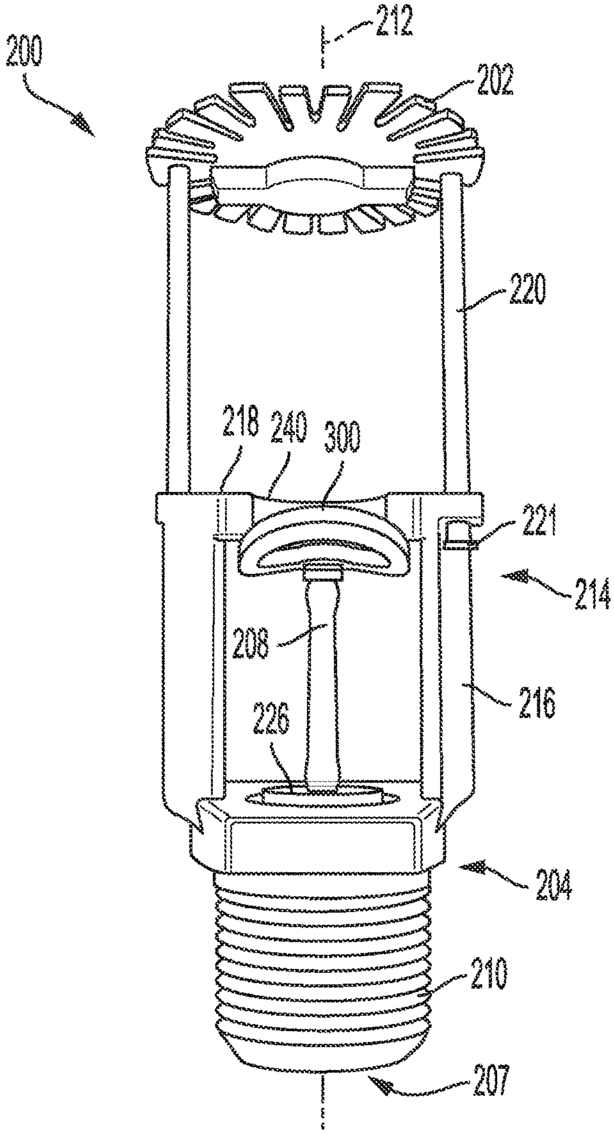
FIG. 2 is a perspective view of a fire sprinkler.
Figure 3:
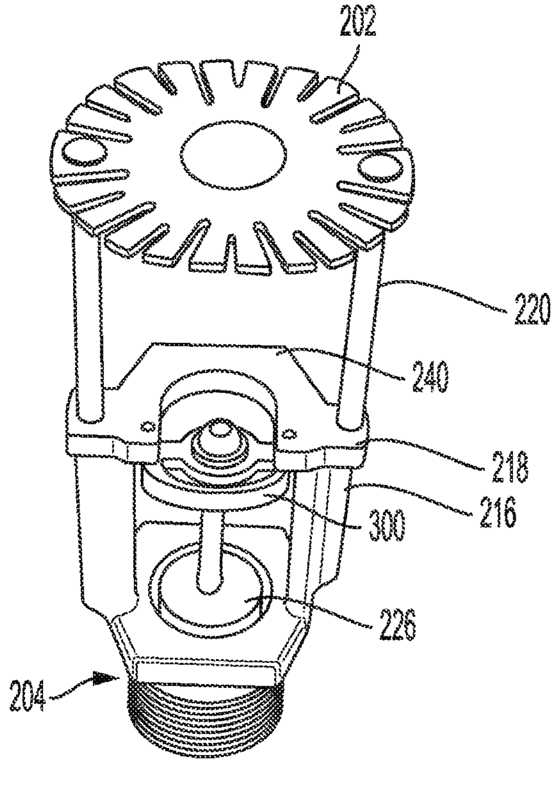
FIG. 3 is a perspective view of a fire sprinkler.
Figure 4:
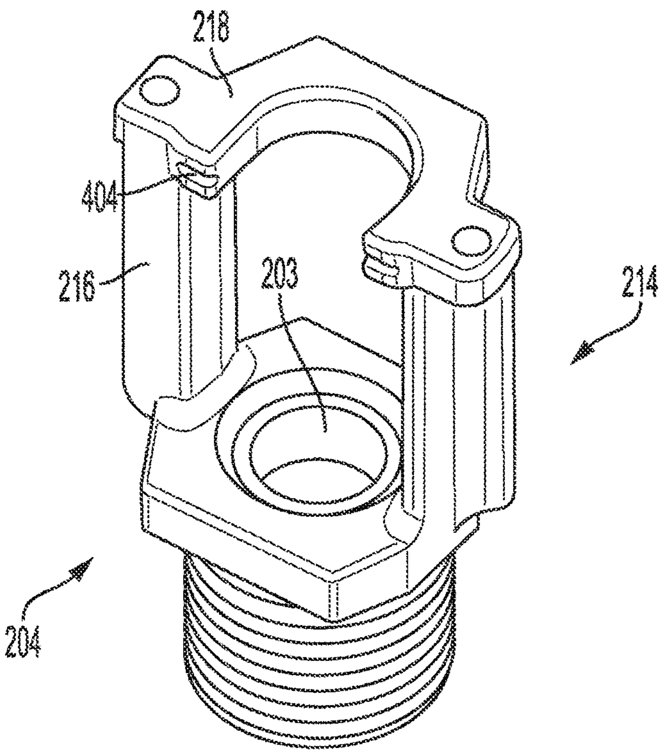
FIG. 4 is a perspective view of a body and a frame of a fire sprinkler.
Figure 5:
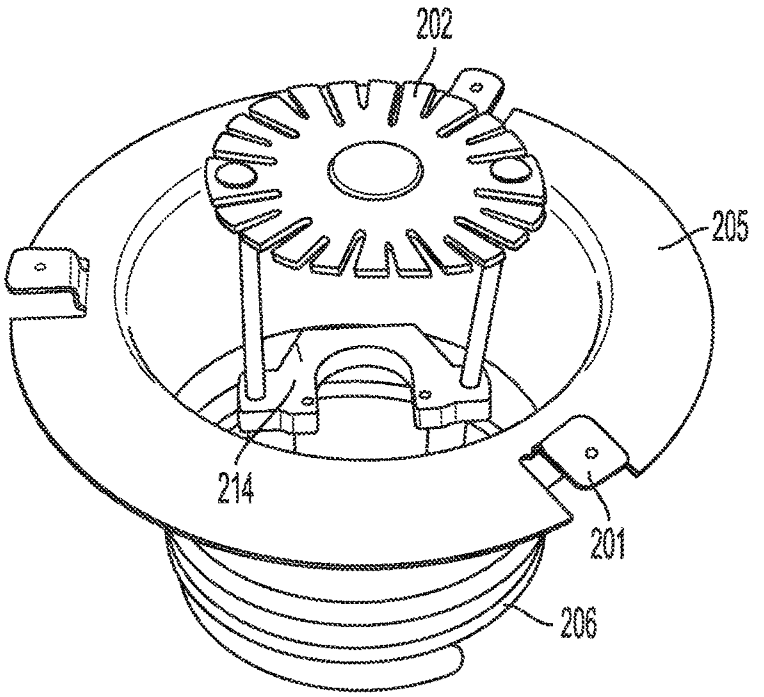
FIG. 5 is a perspective view of a fire sprinkler.
Figure 6:
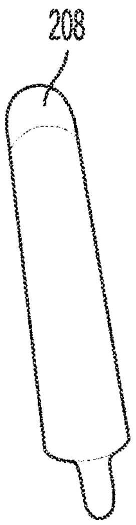
FIG. 6 is a perspective view of an activation element of a fire sprinkler.

FIGS. 2-10 depict an example of a sprinkler 200. As shown in FIGS. 4 and 5, the sprinkler 200 includes a housing 206 that can be coupled with a body 204. The housing 206 can be a cylindrical casing configured to surround at least the body 204, such as a sprinkler cup or support cup. The housing 206 can be coupled with the body 204 through one or more coupling mechanisms, for example threading or a snap fit. The housing 206 can be releasably coupled with the body 204, for example to facilitate installation and other processes for the sprinkler 200. The housing 206 can include a mounting surface 205 configured to extend radially outward from the housing 206. The mounting surface 205 can be disposed at one end of the housing 206. The mounting surface 205 can be a flange, a plank, or any other extending surface configured to interface with the ceiling. For instance, the surface of the mounting surface 205 facing toward the housing 206 can be positioned against the ceiling. The mounting surface 205 can be configured to threadably couple to the housing 206. The mounting surface 205 can include at least one tab 201. The at least one tab 201 is configured to couple to a cover plate (not shown). For instance, the at least one tab 201 can be soldered to the cover plate. The cover plate can couple to the mounting surface 205 with pins, screws, compression, or other suitable attachments mechanism. The cover plate is configured to be nearly flush with the ceiling, such that the sprinkler 200 is a concealed sprinkler. The cover plate can be a disc, a plank, or any other surface with a flat profile. Once activated by heat, cover plate can be released (e.g., falls away) from the mounting surface 205 and the housing 206 such that the sprinkler 200 is exposed for fire prevention.

As depicted in FIG. 2, the body 204 is positioned around a sprinkler axis 212. The housing 206 is coupled with the body 204 such that a portion of the housing 206 surrounds at least a portion of the body 204 in a lateral dimension. The body 204 includes a coupler 210 (which is depicted as a threading, but may comprise other couplers/coupling components) extending from the body (e.g., extending vertically from the body in the frame of reference depicted in FIG. 2) and protruding from the housing 206. The coupler 210 is positioned around the sprinkler axis 212, and can include an opening 207 disposed at an end of the coupler 210 opposite the housing 206. The opening 207 can be adjacent to a channel, where the channel is defined by inner walls of the body 204. The channel can extend into and through the body 204 along the sprinkler axis 212. The channel can have a cylindrical geometry, or may include portions in which the geometry of the channel is tapered or widened as defined by inner walls of the body 204. When the sprinkler 200 is activated, fire suppression fluid may flow from a fluid supply through the channel. In some aspects, fire suppression fluid can be retained within the channel or a portion thereof when the sprinkler 200 is in an inactivated state. In an inactivated state, sprinkler 200 includes fluid seals within the body. Fluid seals within the body are formed by applying force to one or more sealing elements by frame arms and thermal elements of the sprinkler 200 to prevent fire suppression fluid from being communicated from a fluid supply line through the body 204 and dispersed over an area. In an activated state, frame arms and thermal elements applying force to sealing elements cease to apply force to sealing elements as thermal elements rupture in response to a condition (e.g., melting from heat exposure, rupture of volume in response to gas expansion, etc.) and thus frame arms lose contact with the body 204 of the sprinkler 200. Responsive to activation of the sprinkler 200, the fire suppression fluid can flow through the channel past one or more seals released in response to the activation of the sprinkler 200 such that fire suppression fluid can be dispersed from the body 204 such that the fire suppression fluid can be distributed or deflected to an area.

The coupler 210 can couple with a fluid supply (e.g., a portion of a pipe system such as piping 120 or fluid supply 110 as depicted in FIG. 1, etc.). The opening 207 provides fluid communication between the body 204 (and components disposed within the body) and the fluid supply such that fire suppression fluid can be communicated from the fluid supply and into the body 204 of the sprinkler 200. The fluid supply can provide fire suppression fluid to the sprinkler 200 via the opening 207, such that the fire suppression fluid can be dispensed from the sprinkler 200 upon activation of the sprinkler 200 (e.g., in response to a fire).

The sprinkler 200 is shown to include a frame 214 coupled with an inferior portion of the body 204. The frame 214 and the body 204 can be two discrete components affixed together (e.g., welded), or the frame 214 and the body 204 can be manufactured as one integral piece (e.g., one casting). As shown, the frame 214 is coupled with the body 204 via an exterior shoulder of the body 204, where the exterior shoulder of the body 204 can extend in a radial direction outward from the body 204 such that the frame 214 can contact the exterior shoulder of the body to achieve coupling. In some aspects, the frame 214 can be coupled with the body 204 through other coupling mechanisms, for example threading or a snap-fit. The frame 214 includes an upper portion shown to be coupled with the inferior portion of the body 204, where the upper portion of the frame 214 is substantially cylindrical. For example, the upper portion of the frame 214 coupled with the inferior portion of the body 204, where the upper portion of the frame 214 has a cylindrical shape with an opening. As shown, the opening of the upper portion of the frame 214 is aligned with the sprinkler axis 212 such that fire suppression fluid can be communicated along the sprinkler axis 212 through a central portion of the frame 214.

The frame 214 includes a pair of legs 216 extending in a distal direction from the portion of the frame 214 that is coupled with the inferior portion of the body 204. The pair of legs 216 can be oriented in various manners relative to the frame 214 from one another, such as 180 degrees apart as depicted in the example of FIGS. 2-4. The pair of legs 216 include a pair of feet 218 disposed at distal portions of each leg of the pair of legs 216, with each foot of the pair of feet 218 including an aperture (not shown). The sprinkler 200 further includes a pair of guide pins 220, where each of the guide pins 220 are coupled with a top surface of a deflector 202. The guide pins 220 are sized such that they can be translated vertically within the apertures of the feet 218 such that the deflector 202 can be translated vertically below the frame 214. The frame 214 can include an end wall 240 extending between the feet 218.

Each of the guide pins 220 include a head 221. The head 221 can have a lateral dimension greater than that of the apertures of the feet 218 such that the head 221 of each of the guide pins 220 defines a maximum distal position of the deflector 202 when the guide pins 220 are extending from the frame 214. The lateral dimension of the guide pins 220 can be less than that of the apertures such that the guide pins 220 can be translated through the apertures, with the head 221 of each of the guide pins having a lateral dimension greater than that of the apertures such that the head 221 of the guide pins cannot pass through the apertures.

The sprinkler 200 is shown to include a support bridge 300. The support bridge is configured to act as a trigger mechanism for the fire sprinkler to allow use of the fire sprinkler in at least two orientations. For instance, the sprinkler can be used in an upright configuration (e.g., a discharge orifice positioned pointing in an upward position) or a pendent configuration (e.g., a discharge orifice positioned pointing in a downward position). The support bridge can be provided as an integral piece within the fire sprinkler so as provide structural rigidity and to act as a support member for a sealing assembly to retain the fire protection fluid within the fluid supply or piping until the fire sprinkler is activated. The support bridge 300 may be movably coupled to the fire sprinkler. For instance, due to a semi-circular shape of the support bridge 300, the support bridge can provide a lever or cam type mechanical reaction of motion for clearing the path of the fire protection fluid stream. The support bridge 300 can be semi-circular, rectangular, triangular, or any shape suitable to act as the lever mechanism.

Figure 10:
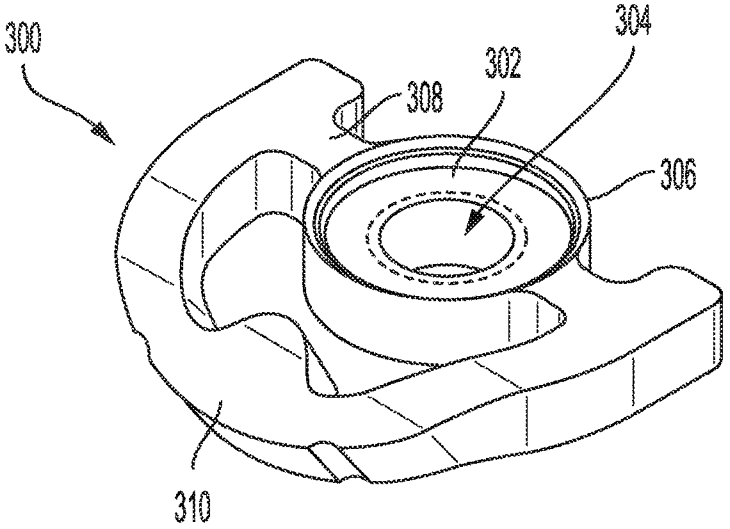
FIG. 10 is a perspective view of a support bridge of a fire sprinkler.

As shown in FIG. 10, the support bridge 300 includes a center 302. The center 302 is a central plate from which the other components of the support bridge 300 extend. The center 302 can have a first height and a first diameter such that the first height is less than the first diameter. The center 302 can be circular as shown, or may be oblong, rectangular, etc. The center 302 includes an aperture 304 and an outer flange 306. The aperture 304 can receive the activation element 208 so that the support bridge 300 can provide support to the activation element 208 (e.g., until the activation element 208 breaks). The aperture 304 can form a cylindrical opening through the center 302. For instance, the aperture 304 can have a second diameter less than the first diameter. The aperture 304 can be a through hole or may be only as deep as is necessary to receive the activation element 208. The outer flange 306 can extend away from an upper surface of the support bridge 300 so as to provide alignment and security for the activation element 208.

Figure 9:
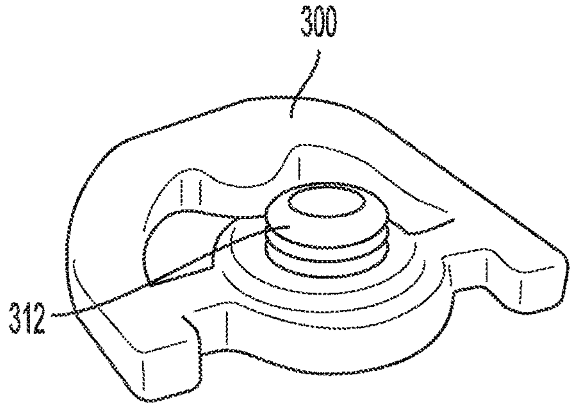
FIG. 9 is a perspective view of a support bridge of a fire sprinkler.

As shown in FIG. 9, the support bridge 300 includes or can be coupled with a loading screw 312 (e.g., a set screw). The loading screw 312 is configured to be threaded into the aperture 304. For instance, the aperture 304 can be a threaded hole of the center 302 configured to receive the threads of the loading screw 312. The loading screw 312 is configured to receive an Allen wrench, for example, in a top opening 314 to tighten the loading screw 312. The side of loading screw 312 opposite the top opening 314 is configured to interface with the activation element 208. For instance, the support bridge 300 sets in the frame 214 and is tightened against the activation element 208 once positioned in place to create a seal.

Referring still to FIG. 10, the support bridge 300 further includes first and second bridge arms 308 extending from opposite sides of the center 302. The first and second bridge arms 308 can extend from the center 302 at 180 degrees from each other. The first and second bridge arms 308 can extend from the center 302 at any angle from each other (e.g., 120, 90, 30 degrees, etc.) so as to provide structural stability and balance for the support bridge when positioned within the frame 214. The first and second bridge arms 308 can have a second height such that the second height is the first height and a length of the outer flange 306. The second height can also be the same or less than the first height.

An arch 310 extends from the first bridge arm 308 to the second bridge arm 308 such that the arch 310 is configured in a generally semicircular shape around the center 302. The arch 310 can have a third height equal to the second height. The arch 310, the first and second bridge arms 308, and the center 302 can be formed as a single piece. The arch 310, the first and second bridge arms 308, and the center 302 can be formed as discrete components coupled together (e.g., welded, screwed, or otherwise attached). The arch 310 can form a steep slope between each of the first and second bridge arms 308 and the apex, or the arch 310 can be configured with a gradual slope. The arch 310 can have a bend such that an apex of the arch 310 is angled away from the upper surface of the support bridge 300, forming a saddle-like geometry. The arch 310 can have a bend such that is angled toward the upper surface of the support bridge 300. The arch 310, the first and second bridge arms 308, and the center 302 form an opening. The arch 310 can further include a tab positioned at the apex of the arch 310 and extending into the opening toward the center 302. The tab and the bend together form a cradle to receive/contact a button, explained further herein. The arch 310 can extend past the first and second bridge arms 308. A portion of the arch 310 that extends past the first and second bridge arms 308 can provide a counter balance when the support bridge 300 is positioned in the frame 214. Particularly, the support bridge 300 is configured to be positioned between the feet 218 of the frame 214. For instance, the support bridge 300 is configured to be movably coupled to the feet 218 such that the support bridge 300 can act as a lever.

The sprinkler 200 includes a button 226, as depicted in FIGS. 2, 3, 7, and 8. The button 226 includes a base 225 and an upper portion 227, with the upper portion 227 extending from the base 225. The base 225 and the upper portion 227 can have a cylindrical geometry, where the base 225 has a greater lateral dimension (e.g., diameter, perimeter, etc. in a plane perpendicular to the sprinkler axis 212 when the button 226 is positioned in the sprinkler 200) than that of the upper portion 227.

The base 225 may be a flat circular plate with a divot 704 on an outer surface configured to align with the activation element 208. The upper portion 227 can have a slanted surface 708 such that the portion of the upper portion 227 at the base 225 has a greater lateral dimension than an edge of the upper portion 227 opposite the base 225. The slanted surface 708 can enable more effective ejection of the button 226 from the sprinkler 200 to allow for proper output of fluid from the sprinkler 200 to respond to a fire condition. For example, the slanted surface 708, responsive to the force applied by fluid received through the channel defined through the body 204, can enable the button 226 to be ejected in a direction away from the sprinkler axis 212 to prevent the button 226 from contacting components such as the frame 214 or deflector 202.

The button 226 includes a washer 228. The washer 228 may be a Belleville seal, a conical spring seal, or the like. The washer 228 can be disposed on the side of the base 225 from which the upper portion 227 extends.

Figure 7:
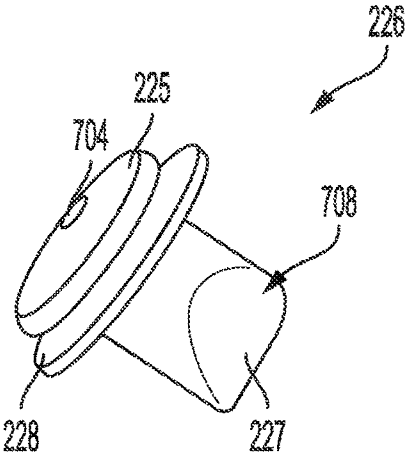
FIG. 7 is a perspective view of a button of a fire sprinkler.
Figure 8:
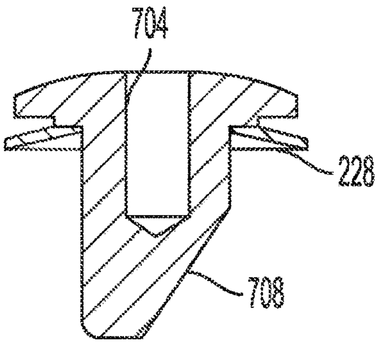
FIG. 8 is a section view of a button of a fire sprinkler.

As shown in FIGS. 2-4, the upper portion 227 can be received by a central opening 203 of the body 204. As depicted in the example of FIG. 7, the upper portion 227 of the button 226 can have a lateral dimension lesser than that of the channel of the body 204. For example, the upper portion 227 of the button 226 extends into the channel 209. When the upper portion 227 is received by the channel 209, the washer 228 can engage with the body 204 to form a seal between the base 225 of the button 226 and the body 204. In the sealed configuration such as that of the example shown in FIG. 2, the upper portion 227 of the button 226 can be contacted by fire suppression fluid.

Referring still to the sealed configuration as shown in FIGS. 2-3, the activation element 208 can be retained laterally (e.g., restricted from movement away from the sprinkler axis 212) by the upper portion 227 of the button 226 and the aperture 304 of the support bridge 300. A first end of the activation element 208 can contact the divot 704 of the base 225 of the button 226. For instance, the first end can come to a tip or be a rounded end configured to rest in and couple to the divot 704 to secure the activation element 208 in its lateral position. A second end of the activation element 208 can contact the aperture 304 of the support bridge 300 (e.g., secured by the aperture 304 and the outer flange 306) to load (e.g., compress) the support bridge 300 and the button 226. For instance, due to a semi-circular shape of the support bridge, a force can be applied along the sprinkler axis 212 used for sealing the waterway orifice. Collectively, the force exerted on the button 226 by the support bridge 300 via the activation element 208 can form a fluid seal between at the button 226 and the central opening 203 of the body 204 via the washer 228. Such contact between the button 226 and the central opening 203 of the body 204 can provide a seal to prevent fire suppression fluid from flowing out of the sprinkler 200, such that fluid communication is prevented between a first side of the seal (e.g., fire suppression fluid or fluid supply) and a second side of the seal (e.g., a room or other area, or components of the sprinkler 200 that disperse fire suppression fluid over a given area).

The activation element 208 can be configured to activate the fire sprinkler according to one or more stimuli. For example, in the example of FIGS. 2, 3, and 6, the activation element 208 includes a thermal activation mechanism that undergoes a state change responsive to an external temperature being greater than a threshold temperature. The activation element 208 can change from a first state that prevents fluid flow out of the sprinkler 200 to a second state that permits fluid flow of the sprinkler 200 responsive to a fire condition. For example, the activation element 208 can include a glass bulb including a fluid that expands responsive to an increase in temperature (e.g., responsive to heat provided to the fluid from a fire), such as to cause the glass bulb to break responsive to the temperature meeting or exceeding a threshold temperature. When the glass bulb of the activation element 208 in the center of the frame 214 breaks, the fluid flow is permitted.

The button 226 in the sealed configuration can be in a first state within the interior of the body 204 in which one or more seals are formed. Responsive to the activation element 208 undergoing the state change, the button 226 can transition to a second state in which the seals are released and fire suppression fluid is allowed to flow through the body 204 responsive to activation of the activation assembly. For instance, because the button 226 is releasably coupled with the body 204 and the activation element 208, the button 226 resting inside the central opening 203 of the body 204 will drop down once the glass bulb of the activation element 208 breaks. Responsive to releasing of the seal, fire suppression fluid can be communicated along and through the channel of the body 204 from the opening 207 on the upper portion of the body 204 and exits the channel in a lower portion of the body 204.

Upon release of the button 226, the button 226 can drop and contact the support bridge 300. For instance, the button 226 can fall into the cradle of the support bridge 300 formed by the tab and the bend or the arch 310. The support bridge 300 will move (e.g., rotate, flip, spin, etc.) out of the side upon contact by the button 226.

The support bridge can clear the fluid flow of the fire sprinkler from interference due to sealing components moving freely upon activation, allowing the waterway to flow freely and unobstructed to the deflector. The support bridge can slightly interfere with the spray characteristics of the sprinkler on one side while in the upright configuration, while providing secondary effect to the spray characteristics of the water distribution of the sprinkler. When spraying in an upright configuration, the support bridges adds the spray characteristic a "short throw" water distribution (e.g., a 3 foot flow/spray) towards the support bridge side of the sprinkler while providing a "long throw" (e.g., a 24 foot flow/spray) distribution away from the integral support bridge side of the sprinkler. The specialized spray characteristic caused by the support bridge 300 provides added value in an attic fire suppression system, for instance, due to the "long throw" characteristic of the open side of the sprinkler. When a fire sprinkler is used in the upright configuration, the water flows from both ends, so in an attic on top of ridge, the sprinkler can have a "throw" on both sides and provide full protection.

The fire suppression fluid exits the body 204 via the channel such that the fire suppression fluid contacts the deflector 202 disposed beneath the body 204 (and aligned with the sprinkler axis 212). The deflector 202 can disperse the flow of the fire suppression fluid to provide fire protection or suppression for a given area. The deflector 202 can be shaped (e.g., include arrangements of tines) to disperse the fire suppression fluid in one or more desired directions. For example, the deflector 202 can include a protrusion or wall configured to disperse fire suppression fluid over a specific range or area.

Figure 11:
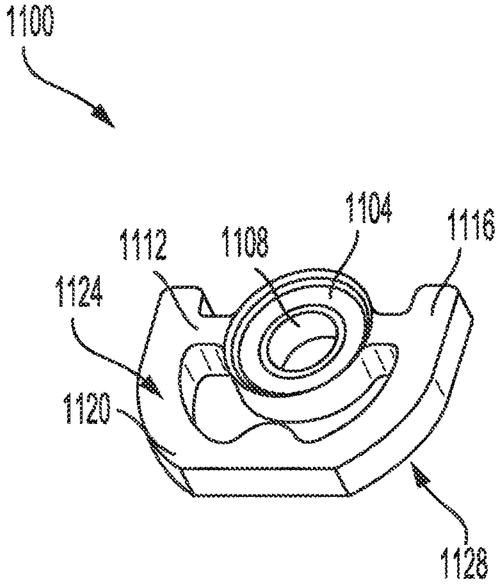
FIG. 11 is a perspective view of a support bridge of a fire sprinkler.
Figure 12:
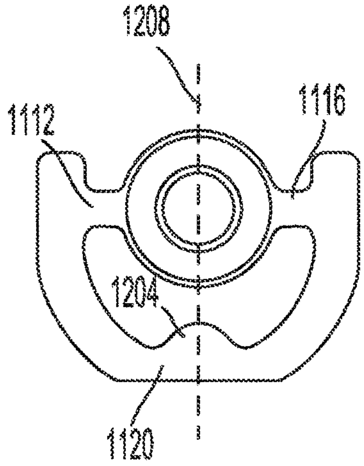
FIG. 12 is a top view of a support bridge of a fire sprinkler.
Figure 13:
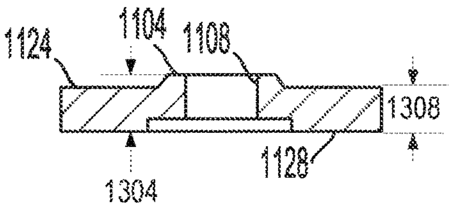
FIG. 13 is a section view of a support bridge of a fire sprinkler.

FIGS. 11-13 depict an example of a support bridge 1100. The support bridge 1100 can incorporate features of the support bridge 300 described herein, and be used with the sprinkler 200. Due to the geometry of the support bridge 1100, the support bridge 1100 can have improved movement away from the sprinkler 200 in response to the activation of the activation element 208, enabling improved fluid flow output from the sprinkler 200.

The support bridge 1100 can include a center 1104 defining an opening 1108. The opening 1108 can receive the loading screw 312 to enable the loading screw 312 to engage the activation element 208. For example, the loading screw 312 can be threaded into corresponding threads in the opening 1108, and be positioned to contact the activation element 208 (e.g., such that an opposing end of the activation element 208 from the loading screw 312 is supported against the button 226). At least one of the loading screw 312 and the opening 1108 can be shaped so that the loading screw 312 extends at least partially out of the opening 1108 (e.g., towards deflector 202), so that the loading screw 312 can engage spring 1400 (e.g., as described with respect to FIGS. 14, 16, and 17).

The support bridge 1100 can include a first bridge arm 1112 and a second bridge arm 1116 each extending from the center 1104 to an arch 1120. Various such features of the support bridge 1100, such as the center 1104, bridge arms 1112, 1116 and the arch 1120, can be formed continuously (e.g., from a same material, such as through a casting or molding process). The center 1104 can have a greater thickness 1304 than a thickness 1308 of the arms 1112, 1116 and the arch 1120. The support bridge 1100 can be symmetrical about an axis 1208 passing through the center 1104 and the arch 1120.

The arch 1120 can be flat, which can facilitate effective release of the support bridge 1100 from the sprinkler 200. For example, a center of mass of the arch 1120 can be in a same plane as a center of mass of the bridge arms 1112, 1116. The arch 1120 can extend no further above or below the bridge arms 1112, 1116 (e.g., at least one of an upper surface 1124 or a lower surface 1128 of the support bridge 1100 is flat or planar). The arch 1120 can have an arcuate or semi-circular form, and a central extension 1204 at a central position between the bridge arms 1112, 1116 that extends back towards the center 1104. FIGS. 11-13 depict the arch 1120 as having curved or arcuate portions extending from the bridge arms 1112, 1116; the arch 1120 can have various degrees of curvature (e.g., including at least some straight portions) while forming a shape extending around one side of the center 1104 and the bridge arms 1112, 1116.

Figure 14:
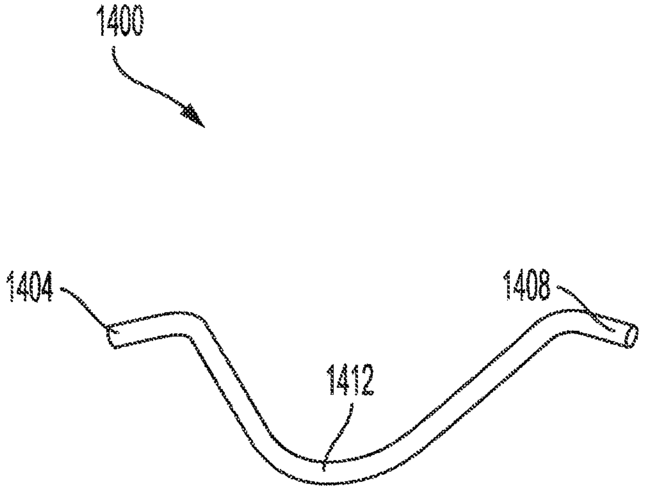
FIG. 14 is a perspective view of a spring of a fire sprinkler.
Figure 15:
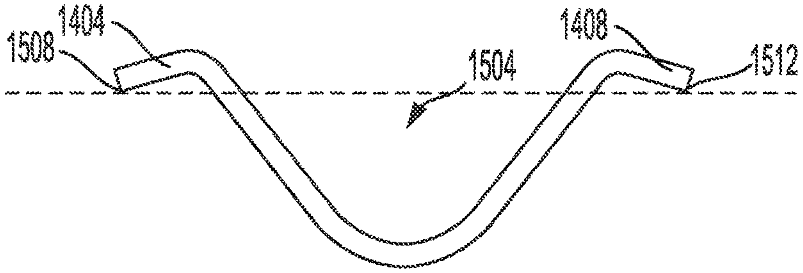
FIG. 15 is a side view of a spring of a fire sprinkler.

FIGS. 14 and 15 depict an example of a spring 1400. The spring 1400 can be used to couple the support bridge 1100 with the frame 214, and facilitate release of the support bridge 1100 responsive to activation of the activation element 208. The spring 1400 extends from a first end 1404 to a second end 1408, which can each be received in respective slots 404 of the frame 214 as depicted in FIGS. 3 and 4.

The spring 1400 includes a central portion 1412 between the ends 1404, 1408. The spring 1400 can be angled between the ends 1404, 1408 and the central portion 1412, so that the central portion 1412 can extend around the center 1104 of the support bridge 1100 (e.g., around an opposite side of the support bridge 1100 from the arch 1120), so that the spring force of the spring 1400 is directed in a direction along an axis through the center 1104 and a center of the arch 1120, allowing for activation of the activation element 208 to cooperate with the spring 1400 to release the support bridge 1100. For example, the slots 404 of the frame 214 can receive the ends 1404, 1408 on a first side of the sprinkler axis 212 (e.g., a same side as where the arch 1120 is located), and the spring 1400 can be shaped so that the central portion 1412 is positioned on a second side of the sprinkler axis 212 opposite the first side (e.g., on a same side of the sprinkler axis 212 as the end wall 240. The spring 1400 can define a receiving space 1504 between edges 1508, 1512 (e.g., outermost edges) of the respective ends 1404, 1408, the receiving space 1504 sized to receive at least one of the loading screw 312 and the support bridge 1100. The central portion 1412 of the spring 1400 can contact the loading screw 312 (e.g., a portion of the loading screw 312 extending out of the opening 1108 of the support bridge 1100).

Figure 16:
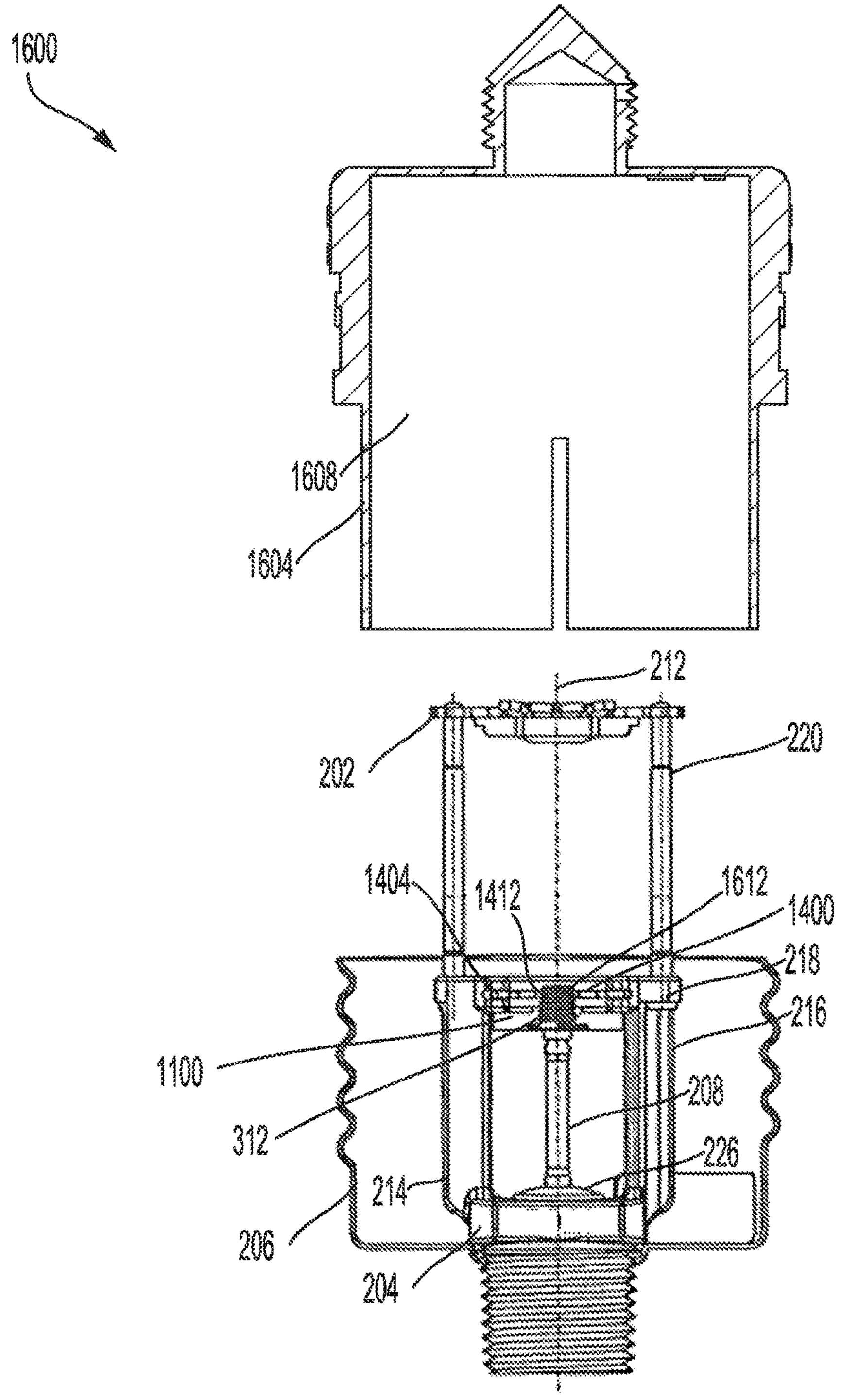
FIG. 16 is a perspective view of a fire sprinkler assembly.
Figure 17:
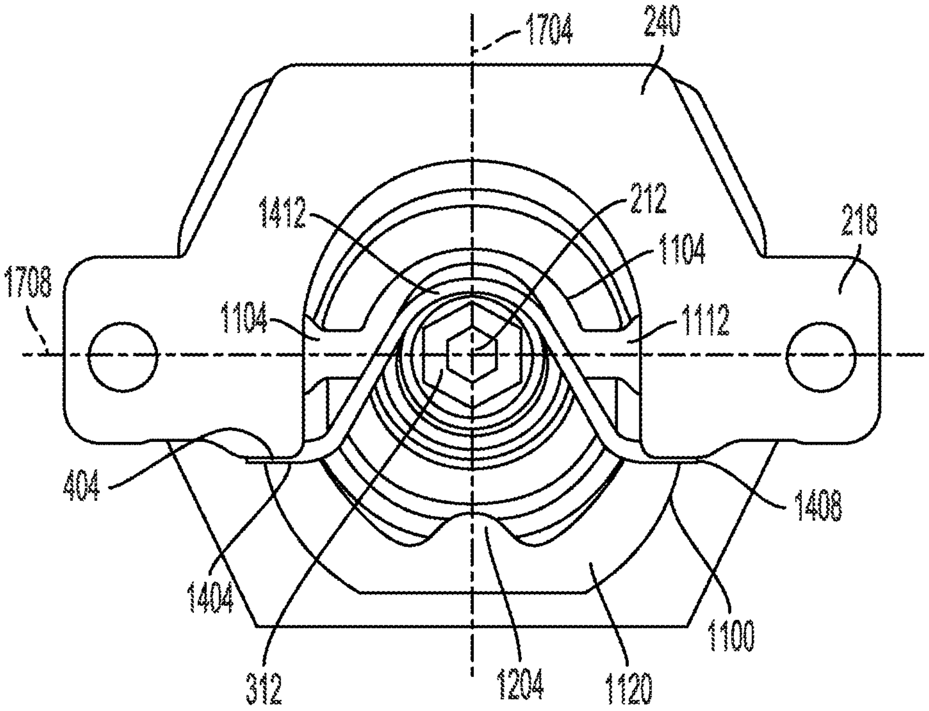
FIG. 17 is an end view of components of a fire sprinkler assembly including a support bridge, loading screw, and spring.

FIGS. 16 and 17 depict an example of a sprinkler assembly 1600 that can incorporate various components described herein, including the sprinkler 200, loading screw 312, support bridge 1100, spring 1400, and housing 206 (e.g., support cup). The sprinkler assembly 1600 can be implemented for concealed sprinkler applications. For example, the sprinkler assembly 1600 can include a cover 1604 (e.g., cap). The cover 1604 can be used as a concealing or protective cover, such as to cover the deflector 202, activation element 208, and other components of the sprinkler 200. The cover 1604 can be releasably coupled with the housing 206, to allow the deflector 202 to output fluid responsive to a fire condition. The cover 1604 can define a chamber 1608 in which the deflector 202 and other components of the sprinkler 200 can be received.

In the arrangement (e.g., assembled state of the sprinkler assembly 1600) depicted in FIGS. 16 and 17, the loading screw 312 can be positioned between (and engaged with) the activation element 208 and the support bridge 1100, such as by being received at least partially through the support bridge 1100 (e.g., through opening 1108 of the support bridge as depicted in FIGS. 11-13) while contacting the activation element 208. A portion 1612 of the loading screw 312 can extend out of the support bridge (e.g., in a direction away from the button 226 and towards the deflector 202), and be engaged with the central portion 1412 of the spring 1400, such that the support bridge 1100 and activation element 208 can be coupled with the frame 214 by the engagement with the spring 1400 and the frame 214 (e.g., the ends 1404, 1408 of the spring 1404 being received in the slots 404 of the frame 214). At least one of the loading screw 312 and the support bridge 1100 can be shaped so that the central portion 1412 contacts the at least one of the loading screw 312 and the support bridge 1100.

As depicted in FIGS. 16 and 17, components of the sprinkler assembly 1600 can define a first axis 1704 that extends in a first plane that extends through the end wall 240, central portion 1412, loading screw 312, central extension 1204, and arch 1120, and a second axis 1708 in a second plane that is perpendicular to the first axis 1704 and extends through the feet 218 and the loading screw 312 and along the bridge arms 1112, 1116. The first and second axes 1704, 1708 can be perpendicular to each other and the sprinkler axis 212, and can intersect at the sprinkler axis 212 (e.g., the sprinkler axis 212 can lie in each of the first and second planes, which are perpendicular to each other).

The spring force of the spring 1400 can be applied to the loading screw 312 in a direction along the first axis 1704 away from the end wall 240, such as to bias the loading screw 312 away from the end wall 240 (and can also hold or bias the loading screw 312 away from each of the feet 218, such as due to the spring 1400 contacting the loading screw 312 along a contour of the loading screw 312 from the first axis 1704 towards the second axis 1708 on each side of the first axis 1704).

Responsive to activation (e.g., breaking) of the activation element 208, the activation element 208 can disengage from the loading screw 312, releasing an engagement force between the activation element 208 and the loading screw 312, which can include a force component along the sprinkler axis 212 as well as along the first axis 1704 due to friction or other mechanical engagement between the activation element 208 and the loading screw 312. As such, the spring force (e.g., bias force) applied by the spring 1400 on the loading screw 312 (which would otherwise be counteracted by the engagement between the activation element 208 and the loading screw 312) can drive the loading screw 312 and the support bridge 1100 engaged with the loading screw 312 away from end wall 240 and the sprinkler axis 212 along the first axis 1704, which can free the flow path through the sprinkler assembly 1600 to the deflector 202. For example, responsive to activation of the activation element 208, the support bridge 1100 can be ejected along the first axis 1704 away from the end wall 240 and the sprinkler axis 212 to prevent the support bridge 1100 from being caught on other components of the sprinkler assembly 1600 such as the feet 218, end wall 240, or deflector 202 when the activation element 208 is broken.

Figure 18:
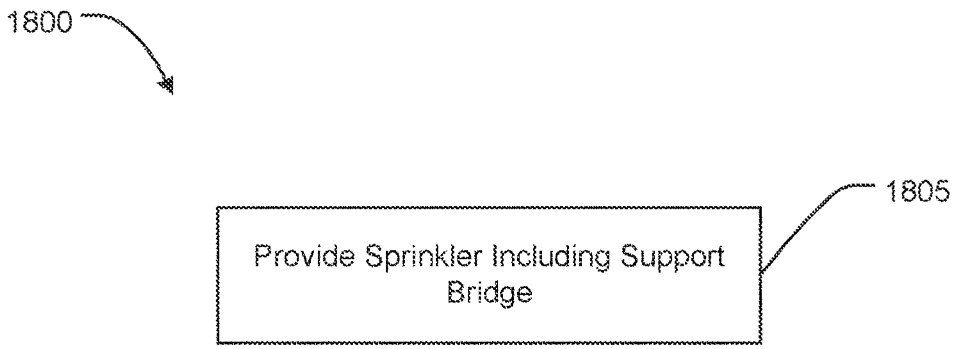
FIG. 18 is a flow diagram of a method of providing a fire sprinkler.

FIG. 18 depicts an example of a method 1800 of providing a fire sprinkler. The method 1800 can be performed using various devices described herein, such as the sprinkler 200.

At 1805, a sprinkler is provided. The sprinkler can include a body, a frame, a button, and a support bridge. The body includes an opening arranged around a sprinkler axis. The frame is coupled with the body. The button includes a slanted surface to be received in the opening. The support bridge includes a center, a first arm extending from the center, a second arm extending from the center, opposite the first arm, and an arch extending from the first arm to the second arm. An activation element can be provided to be coupled with a button and a support bridge of a fire sprinkler. The activation element can exert a force on the button such that the button forms a fluid seal with the opening of the body. The activation element can be provided to be changed from a first state that prevents fluid flow out of the sprinkler to a second state that permits fluid flow of the sprinkler responsive to a fire condition. The button can be coupled with the activation element so that the button releases in response to operation of the activation element. The button can be coupled with the support bridge to enable the support bridge to change stat responsive to operation of the button.

As utilized herein, the terms “approximately,” “about,” “substantially”, and similar terms are intended to include any given ranges or numbers +/−10%. These terms include insubstantial or inconsequential modifications or alterations of the subject matter described and claimed are considered to be within the scope of the disclosure as recited in the appended claims.

It should be noted that the term “exemplary” and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term “coupled” and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled with each other using a separate intervening member and any additional intermediate members coupled with one another, or with the two members coupled with each other using an intervening member that is integrally formed as a single unitary body with one of the two members. If “coupled” or variations thereof are modified by an additional term (e.g., directly coupled), the generic definition of “coupled” provided above is modified by the plain language meaning of the additional term (e.g., “directly coupled” means the joining of two members without any separate intervening member), resulting in a narrower definition than the generic definition of “coupled” provided above. Such coupling may be mechanical, electrical, or fluidic.

The term “or,” as used herein, is used in its inclusive sense (and not in its exclusive sense) so that when used to connect a list of elements, the term “or” means one, some, or all of the elements in the list. Conjunctive language such as the phrase “at least one of X, Y, and Z,” unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., “top,” “bottom,” “above,” “below”) are merely used to describe the orientation of various elements in the FIGURES. It should be noted that the orientation of various elements may differ according to other exemplary embodiments, and that such variations are intended to be encompassed by the present disclosure.

The construction and arrangement of the fitting assembly as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A sprinkler, comprising;

a body defining an outlet;

a button to seal the outlet;

an activation element coupled with the button, the activation element having a fluid; and a support bridge to couple with the activation element, the support bridge comprising:

a center;

a first arm extending from the center;

a second arm extending from the center, opposite the first arm;

an arch extending from the first arm to the second arm, a surface formed by the arch, the first arm, and the second arm in a same plane, the a surface is flat; and a spring to engage the support bridge with the body, the spring to apply a spring force to at least one of the support bridge and a loading screw coupled with the support bridge in a direction away from an axis extending through the center and the button.

2. The sprinkler of claim 1, comprising:

a deflector on an opposite side of the activation element from the button.

3. The sprinkler of claim 1, comprising:

a loading screw to be received in the center and engage the activation element.

4. The sprinkler of claim 1, comprising:

a washer coupled with the button.

5. The sprinkler of claim 1, comprising:

the center has a greater thickness than the first arm and the second arm.

6. The sprinkler of claim 1, comprising:

the button comprises a base and an upper portion extending from the base, the upper portion to be received by the opening outlet of the body.

7. The sprinkler of claim 1, comprising:

the button comprises a slanted surface.

8. The sprinkler of claim 1, comprising:

a deflector movably coupled with the body.

9. A sprinkler assembly, comprising:

a body comprising an opening arranged around an axis;

a frame coupled with the body;

a button including a slanted surface to be received in the opening;

an activation element to facilitate the button sealing the opening, the activation element comprising a glass bulb;

a bridge to releasably couple with the button and the activation element, the bridge comprising a first arm, a second arm, and an arch extending from the first arm to the second arm, the first arm, the second arm, and the arch form each of a first planar surface and a second planar surface opposite the first planar surface, the first planar surface and the second planar surface are flat;

a spring coupled with the bridge and the frame to eject the bridge away from the axis responsive to activation of the activation element; and a loading screw to be received in a center of the bridge and engage the activation element.

10. The sprinkler assembly of claim 9, comprising:

the frame comprises one or more slots to receive the spring.

11. The sprinkler assembly of claim 9, comprising:

a deflector on an opposite side of the activation element from the button.

12. The sprinkler assembly of claim 9, comprising:

a washer coupled with the button.

13. The sprinkler assembly of claim 9, comprising:

a center of the bridge has a greater thickness than the first arm and the second arm.

14. The sprinkler assembly of claim 9, comprising:

the button comprises a base and an upper portion extending from the base, the upper portion to be received by the opening of the body.

15. The sprinkler assembly of claim 9, comprising:

the button comprises a slanted surface.

16. The sprinkler assembly of claim 9, comprising:

a deflector movably coupled with the body by one or more guide pins.

* * * * *